United States Patent [19]
Hall, Jr. et al.

[11] Patent Number: 5,805,166
[45] Date of Patent: Sep. 8, 1998

[54] SEGMENTED STATUS AREA FOR DYNAMICALLY REPORTING STATUS IN A DATA PROCESSING SYSTEM

[75] Inventors: George E. Hall, Jr., Hillsborough; Mark Edward Molander, Cary, both of N.C.

[73] Assignee: Intenational Business Machines Corp., Armonk, N.Y.

[21] Appl. No.: 701,921

[22] Filed: Aug. 23, 1996

[51] Int. Cl.⁶ .............................. G06F 3/14; G06F 17/00
[52] U.S. Cl. .................... 345/349; 345/970; 345/969; 345/966; 345/354; 364/188
[58] Field of Search .................... 395/349, 348, 395/970, 969, 965–967, 354, 356, 347, 339, 140; 364/188

[56] References Cited

U.S. PATENT DOCUMENTS

| | | | |
|---|---|---|---|
| 5,032,978 | 7/1991 | Watson et al. | 364/188 |
| 5,136,690 | 8/1992 | Becker et al. | 395/349 |
| 5,319,385 | 6/1994 | Aires | 345/156 |
| 5,436,637 | 7/1995 | Gayraud et al. | 395/348 X |
| 5,500,934 | 3/1996 | Austin et al. | 395/348 X |
| 5,576,946 | 11/1996 | Bender et al. | 364/188 X |
| 5,610,828 | 3/1997 | Kodosky et al. | 395/348 X |
| 5,617,529 | 4/1997 | Oran et al. | 395/348 X |
| 5,630,081 | 5/1997 | Rubicki et al. | 395/348 |

OTHER PUBLICATIONS

Up and Running! OS/2 Warp Connect, IBM Corporation, Austin, Texas, 1995, Part No. 27H9183.

"Product Comparison", IDG Communications, Inc., Info-World, Sep. 4, 1995.

"The Seybold Report on Desktop Publishing", Seybold Publications, Inc., vol. 10, No. 1, p. 15, ISSN: 0889–9762, 1995.

"Taking Windows Help to the Limit", PC Magazine, vol. 14, No. 4, p. 233, Feb. 21, 1995, Ziff–Davis Publishing Company, ISSN No. 0888–8507.

"Test Drives", Data Based Advisor, Data Based Solutions, Inc., Dec., 1994, p. 34.

"Lotus Navigates Steady Course with 1–2–3", InforWorld, Reviews, Nov. 30, 1994, p. 85.

*Primary Examiner*—Raymond J. Bayerl
*Attorney, Agent, or Firm*—Jeanine S. Ray-Yarlettes

[57] ABSTRACT

Methods, systems and program products which provide dynamic status to a user. The status is provided by providing a plurality of icons arranged in a pattern corresponding to the relationship between the items the icons represent. User input is acquired which indicates whether the plurality of icons are to be displayed and the icons are selectively displayed based on the user input. A segmented status line is displayed adjacent the plurality of icons. The segmented status line is made up of a plurality of linearly arranged status segments. Each segment of the status line corresponds to at least one of the plurality of icons such that the appearance of a segment of the segmented status line reflects the status of the item associated with the icon corresponding to the segment of the status line. Furthermore, the status segment corresponding to an icon is aligned with its corresponding icon such that the sequence of the segments of the status line correspond to the relationship between the items represented by the icons. The appearance of the segments of the segmented status line is revised as the status of the item corresponding to the segment of the status line changes.

59 Claims, 12 Drawing Sheets

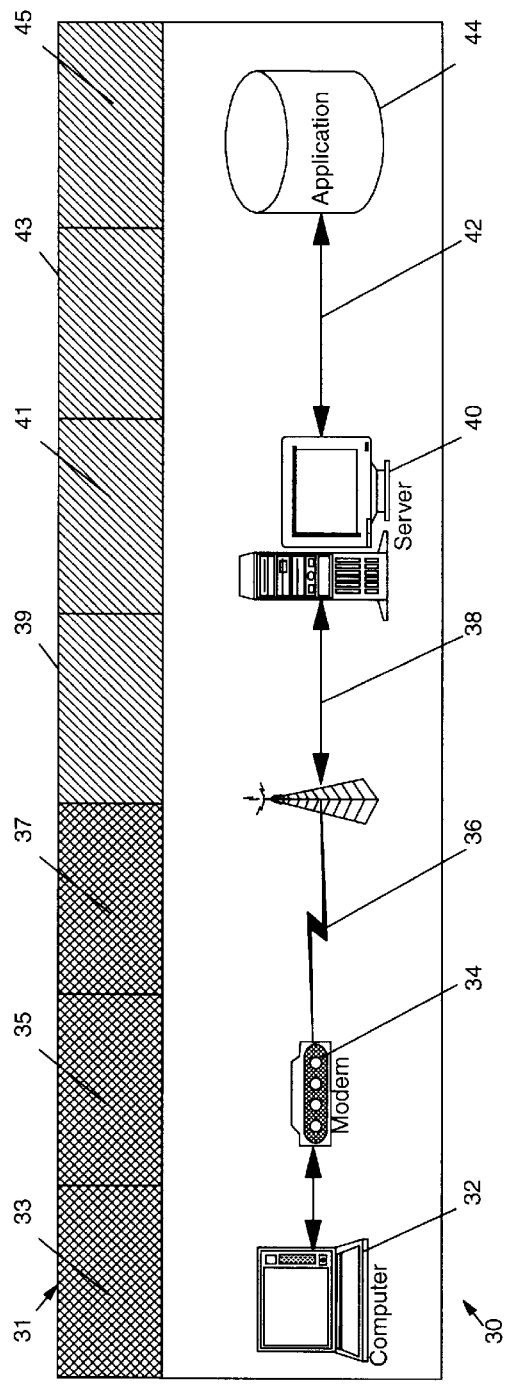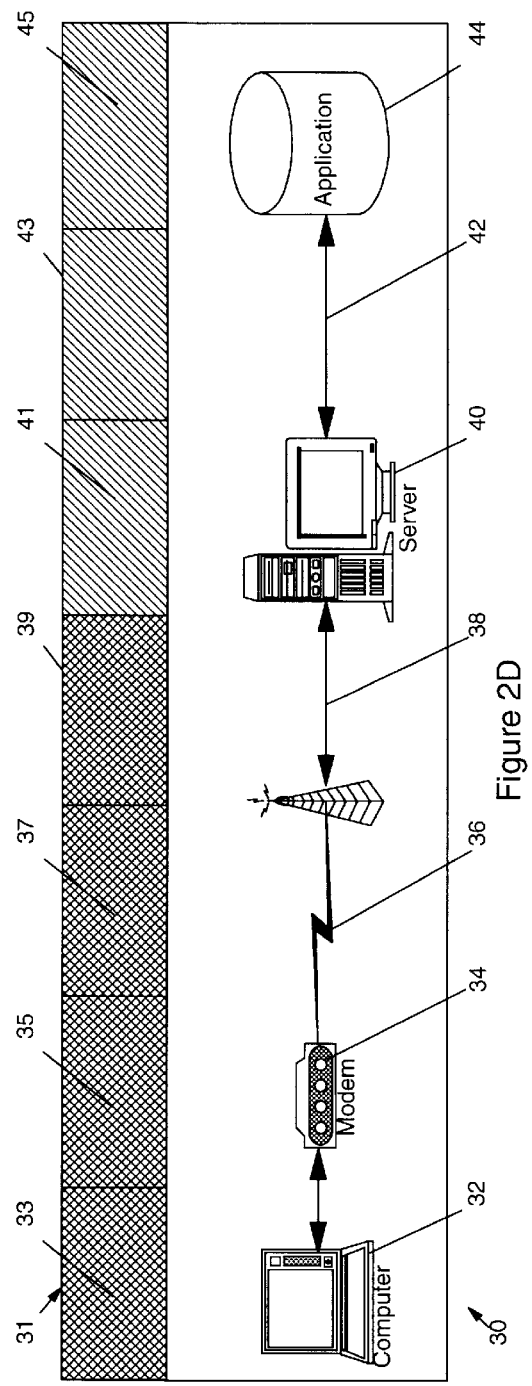

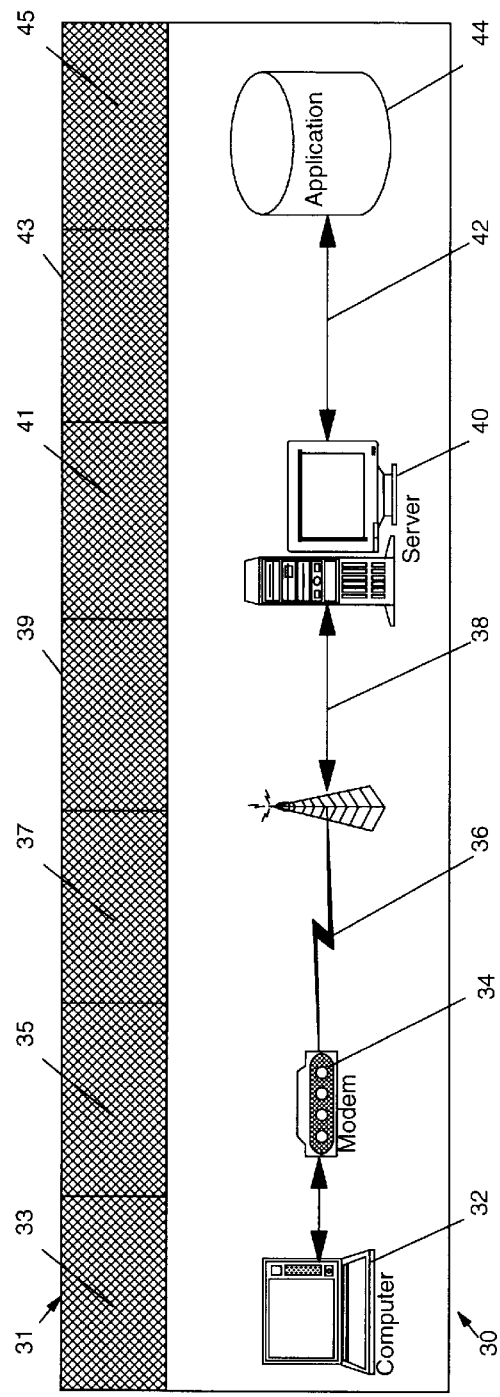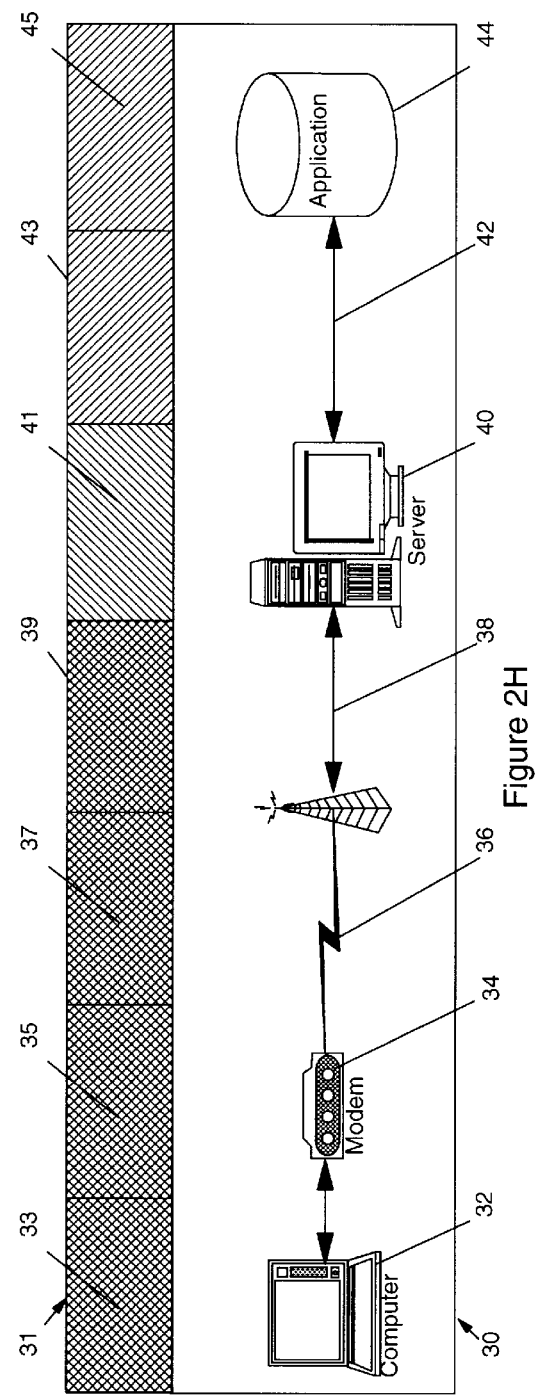

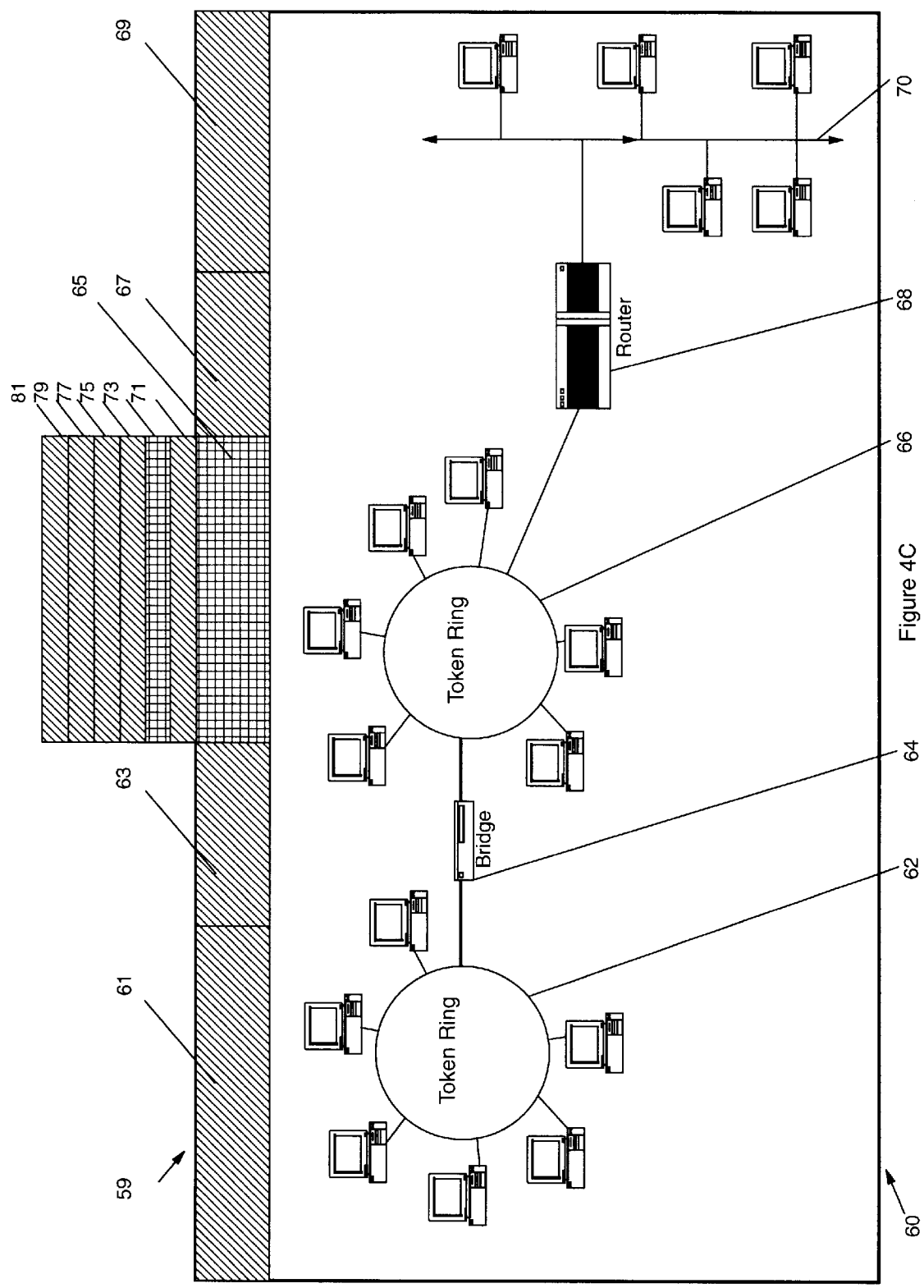

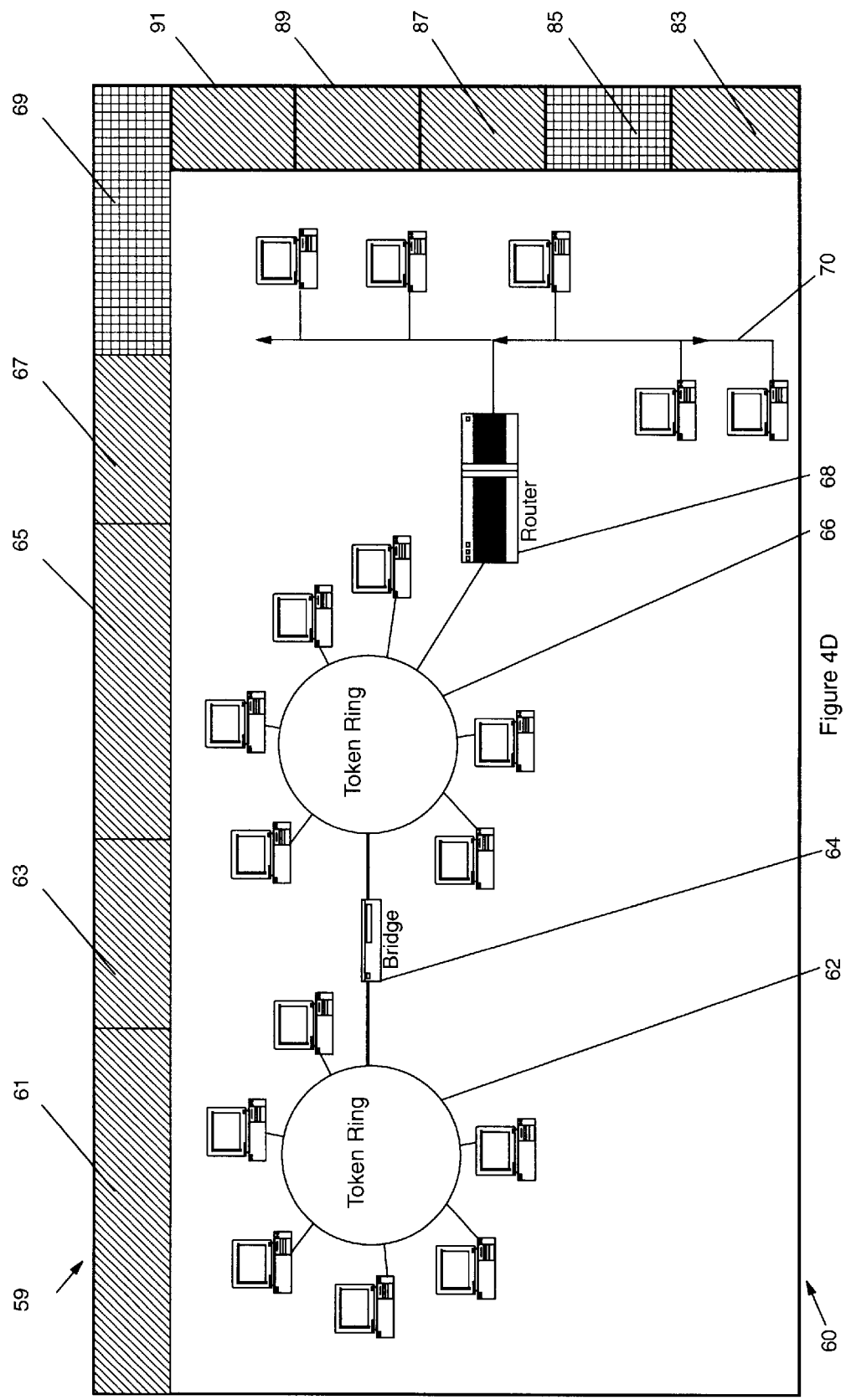

SEGMENTED STATUS AREA FOR DYNAMICALLY REPORTING STATUS IN A DATA PROCESSING SYSTEM

FIELD OF THE INVENTION

The present invention relates generally to user interfaces of data processors. More particularly, the present invention relates to displaying status information in a graphic user interface environment of a data processor.

BACKGROUND OF THE INVENTION

Increases in processing capability and decreases in cost of personal computers has led to the proliferation of personal computers in all aspects of society. Personal computers are utilized in schools, homes and in business. Furthermore, with the decreased costs of personal computers, it has become more feasible from a cost perspective to use computers for tasks and to carry out functions which were previously done without the use of computers.

With the proliferation of computers throughout numerous aspects of life has come a trend to graphic user interfaces which make using a computer more intuitive. Examples of such graphic user interfaces include and IBM OS/2®, Apple® Macintosh®, and Microsoft® Windows®. These operating systems all rely on a "window like" workspace for applications, operating system information such as directory information and program groupings. Multiple workspaces may be displayed on the screen of a computer device simultaneously in what is often referred to as a "desktop."

As a result of the increased complexity and the multi-tasking or multi-thread capabilities of modern graphic interface operating systems such as OS/2®, it has become more and more likely that multiple workspaces will be open on the desktop simultaneously. Furthermore, with ever increasing size and resolution capabilities of display devices for computer it becomes more likely that a meaningful presentation of multiple workspaces is possible. This increase in the use of multiple workspaces has resulted in the proliferation of workspaces on a user's desktop. As a user opens new workspaces the older workspaces may be overlapped and obscured. This proliferation of workspaces, some on top of the desktop, some partially obscured and some completely obscured may often result in a confusing, haphazard and disorganized display of information. Furthermore, as more and more applications utilize more workspaces, desktop space limitations become more apparent.

Often times a user needs to be aware of status information about the system or systems related to their computer or the applications running on their computer. In a conventional graphic user interface, status information, is typically displayed within a workspace or "dialog" box. One existing method of illustrating status is exemplified by the logon progress indicator of the Advantis network access program by IBM®. In the Advantis progress indicator a dialog box with graphics illustrating the connection to be made is displayed. Within the dialog box a textual description describes each step in the logon process. As each step is completed a color filled box around the text is either red for failure or green for success. Upon success or failure the progress dialog box is immediately closed and no further status information is provided. Furthermore, the size and contents of the dialog box are fixed and may not be adapted to varying situations.

The dialog box method, however, may result in the status information being obscured by other workspaces or occupying valuable desktop space if left on top of the desktop. While a conventional method of reducing the desktop real estate of status is by hiding the status information after first displaying the information, this solution fails to account for situations where it is desirable to constantly monitor status.

One benefit of constantly displaying status information is the predictive value it gives to a user. For example, if status information is displayed about the quality of a cellular connection, then as the quality degrades the user can anticipate the loss of signal and take corrective action. Even if no corrective action can be taken, the user is aware of the cause of the loss of connection and will be less frustrated by the event.

In view of the above, it is apparent that there is a need for improvements in user interfaces to allow for presentation of status information with minimal impact and detraction from other applications workspaces.

OBJECTS AND SUMMARY OF THE INVENTION

In view of the above limitations of existing user interfaces, it is an object of the present invention to provide for displaying dynamic status which changes over time.

Another object of the present invention is to provide status in a manner which reduces the amount of display area utilized to display the status information.

Still another object of the present invention is to provide status information to a user in a manner which makes the status of an item quickly discernable as to the status and the item with which the status is associated.

These and other objects of the present invention are provided by methods, systems and program products which provide dynamic status to a user. The status is provided by providing a plurality of icons arranged in a pattern corresponding to the relationship between the items the icons represent. User input is acquired which indicates whether the plurality of icons are to be displayed and the icons are selectively displayed based on the user input. A segmented status line is displayed adjacent the plurality of icons. The segmented status line is made up of a plurality of linearly arranged status segments. Each segment of the status line corresponds to at least one of the plurality of icons such that the appearance of a segment of the segmented status line reflects the status of the item associated with the icon corresponding to the segment of the status line. Furthermore, the status segment corresponding to an icon is aligned with its corresponding icon such that the sequence of the segments of the status line correspond to the relationship between the items represented by the icons. The appearance of the segments of the segmented status line is revised as the status of the item corresponding to the segment of the status line changes.

By creating an arrangement of icons and a segmented status line which indicates the status of the items associated with the icons, a user may quickly ascertain the status of any particular item by the appearance of a segment of the status line. Furthermore, by allowing selective display of the icons, once a user is familiar with the association of segments of the status line and the icons and items they represent, the icons may be removed from the status display to reduce the amount of display area utilized for displaying status. The linear arrangement of the status segments also facilitates grouping a plurality of status lines into an array of multi-segment status lines so that the status of a large number of items may be provided in a minimum of display area.

Thus, in further embodiments of the present invention, the color of the segments of the segmented status line is altered to reflect the status of the items associated with the segment of the segmented status line. Also, the shape of the segments of the segmented status line may be altered to reflect the status of the items associated with the segment of the segmented status line. Text may also be included within the segments of the status line to indicate the item associated with the segment of the segmented status line or the status of that item. To further increase the flexibility of the status display of the present invention, the height and width of the status line and the status segments may be set by user input.

In further embodiments of the present invention, detailed status information related to an item corresponding to a user selected one of the segments of the segmented status line may be displayed. Furthermore, the appearance of the icons may also be altered to reflect the status of the item associated with the icon. Each of these embodiments further the availability of status information to the user and provide flexibility in the manner that information is presented.

In still another embodiment of the present invention, dynamic status is presented to a user by displaying an aggregate status of a plurality of items. In such a case, at least one of the icons represents a plurality of items. The appearance of the status segment corresponding to the icon representing a plurality of items reflects the aggregate status of the items represented by the icon. The appearance of the segment is revised as the aggregate status of the items changes. In such a case, the appearance of large amounts of status information may be condensed to a single segment or small groups of segments. However, if user input is acquired indicating selection of one of the aggregate status segments of the segmented status line the status information of the underlying items of the aggregate status corresponding to the selected segment may be displayed. On particularly space saving manner of displaying this status is by displaying a linear segment for each underlying item of the aggregate status. In this case the appearance of the linear segments corresponds to the status of one of the underlying items of the aggregate status.

As will be appreciated by those of skill in this art, the above described aspects of the present invention may also be provided as system or computer program product.

BRIEF DESCRIPTION OF THE DRAWINGS

FIG. 2A through FIG. 2H are diagrams of various aspects of a status window according to the present invention;

FIG. 4A through FIG. 4D are diagrams of alternative embodiments of the status window of the present invention utilizing aggregate status indicators;

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
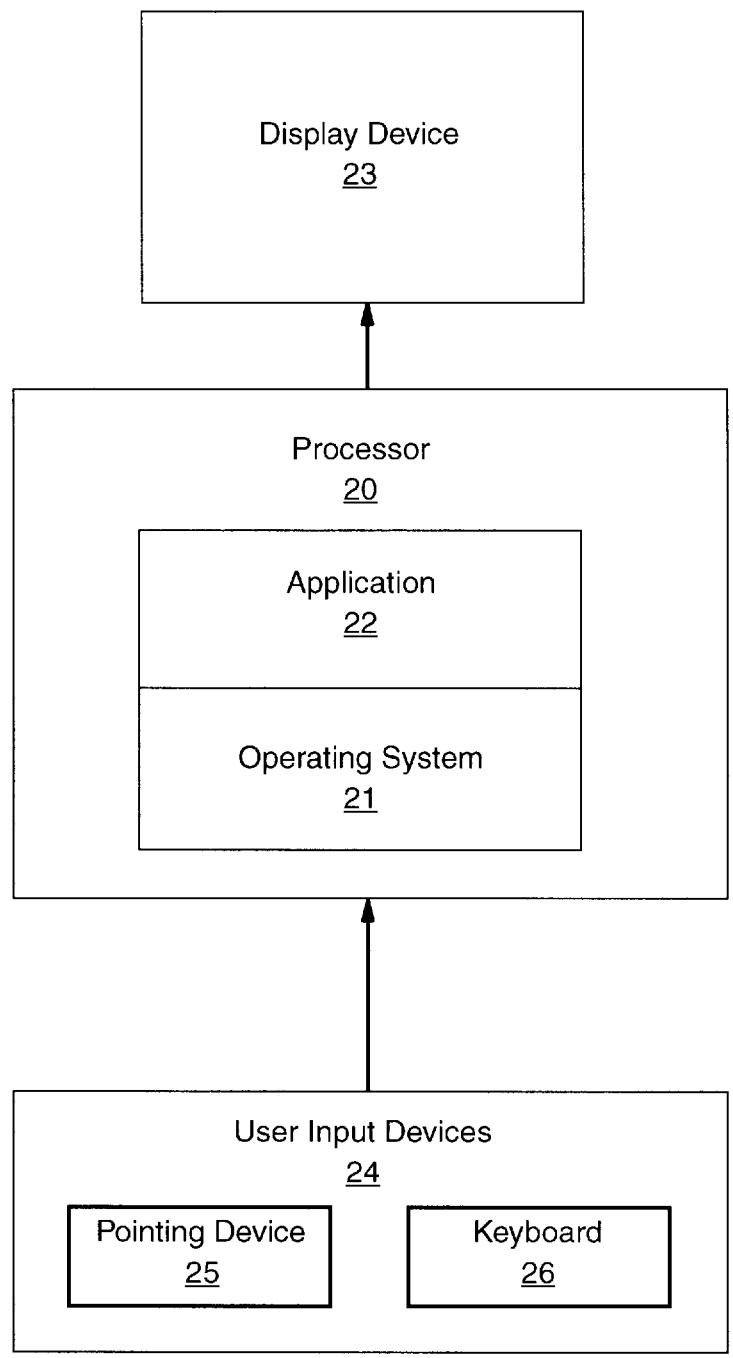
FIG. 1 is a logical diagram of a system utilizing the present invention.

FIG. 1 illustrates a data processing system on which user interfaces according to the present invention may be utilized. As seen in FIG. 1, a data processor 20 may have an operating system 21 resident in the processor. An application 22 may be running on the operating system 21. The processor 20 displays information on a display device 23. The display device 23 has a plurality of picture elements (collectively referred to as a screen) which may define the appearance of a user interface environment displayed on the display device. For each picture element a color characteristics of that element includes hue, brightness, and saturation values. By manipulation of these values for each picture element of the screen the appearance or contents of the screen is established. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to designate the selection or de-selection of user selectable options associated with regions of the screen of the display device. This selection may be based upon, for example, the location of the screen indicated by a pointing device 25 or by a series of keystrokes input by the keyboard 26.

The present invention will now be described with reference to FIGS. 2A through 2H, 3A, 3B and 4A through 4D. Throughout the figures cross-hatching has been utilized to indicate the appearance of a portion of a status display such as a segment of a status line. This cross-hatching is used for illustrative purposes only and, as will be apparent to those of skill in the art, in application the appearance of a portion of the status display may be altered in any of the manners described below. For example, the cross-hatching may represent different colors which would be displayed to indicate status with each cross-hatch pattern corresponding to a specific color. Accordingly, the cross-hatch patterns utilized to describe the present invention should not be considered as limiting the scope of the present invention.

Figure 2A:
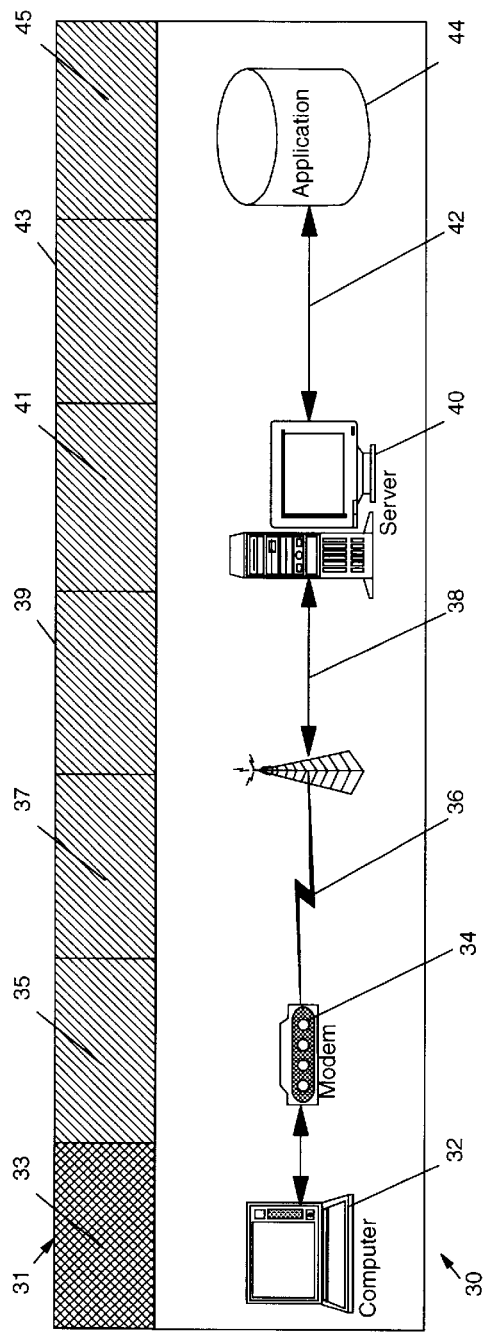

FIGS. 2A through 2H illustrate one embodiment of the present invention. As seen in FIG. 2A, a status window 30 includes a plurality of icons arranged in a pattern corresponding to the relationship between the items the icons represent. Thus, for example, the computer icon 32 may represent the status of a portable computer. The modem icon 34 may represent the status of a modem within the computer represented by the computer icon 32. The connection icon 36 may represent the status of the connection between the modem and a communication provider. The connection icon 38 may represent the connection between the communication provider and a network server represented by icon 40. Similarly, the connection icon 42 may represent the connection between the network server represented by icon 40 and a database represented by the database application icon 44. As is seen in FIG. 2A, the spatial relationship between the icons 32, 34, 36, 38, 40, 42, and 44 represents the relationship between a computer and the connections to access a database application.

Also illustrated in FIG. 2A is a segmented status line 31 which is part of the status window 30. The segmented status line 31 is adjacent the plurality of icons. The segmented status line 31 is comprised of a plurality of linearly arranged status segments 33, 35, 37, 39, 41, 43, and 45. Each segment of the status line corresponds to at least one of the plurality of icons 32, 34, 36, 38, 40, 42, and 44. For example, the segment 33 of the segmented status line 31 corresponds to icon 32 and reflects the status of the item associated with icon 32. The segment 33 is aligned with the icon 32 and its appearance is altered depending upon the status of the item which icon 32 represents. Thus, for example, the color of segment 33 may be modified to reflect the status of the computer corresponding to icon 32. If segment 33 is green, then the computer would be ready or available. If segment 33 is red, then an error has occurred and the computer is unavailable. The appearance of segment 33 is revised as the status of the item corresponding to icon 32 changes.

In a similar manner, each of the segments of status line 31 corresponds to the item associated with icon in the status window 30 such that the appearance of the segment reflects the status of the item associated with an icon and segment. Thus, segment 35 corresponds to the item associated with icon 34, segment 37 corresponds to the item represented by icon 36, segment 39 corresponds to the item represented by icon 38, segment 41 corresponds to the item represented by icon 40, segment 43 corresponds to the item represented by icon 42, and segment 45 corresponds to the item represented by icon 44.

In addition to changing the color to represent status, a segment may change in shape or other appearance. For example, a segment could flash to indicate a status that requires immediate attention. Furthermore, a text indicator may be included in a segment of the segmented status line to indicate the item associated with the segment of the status line. This textual information contained within the segments could also indicate the status of the segment and may be redundant with other appearance modifications indicating status. For black and white systems, the gray-scale value of a segment of the status line may be modified to reflect the status of the item associated with the segment of the status line. The variation in shape, color or gray-scale may have any number of possible appearances to represent the status of the underlying items. For example, the color of the segment may change through a range of colors indicating the severity of a problem with the item associated with the segment. If, for example, the segment represents signal strength of a cellular communication, the color may vary from red (no connection) to green (maximum strength) and shades of yellow in-between for various levels of signal strength. Other examples of changes in appearance which could be utilized to indicate status are fill patterns, flashing, or a mini-icon in the segment. As will be appreciated by one of skill in the art, any number of combinations of attributes of the appearance of a segment may also be changed to indicate status. Thus, for example, not only may the color of a segment of change but the text in the segment or its fill pattern may also change to further identify to the user the status of the item associated with the segment.

Figure 2B:
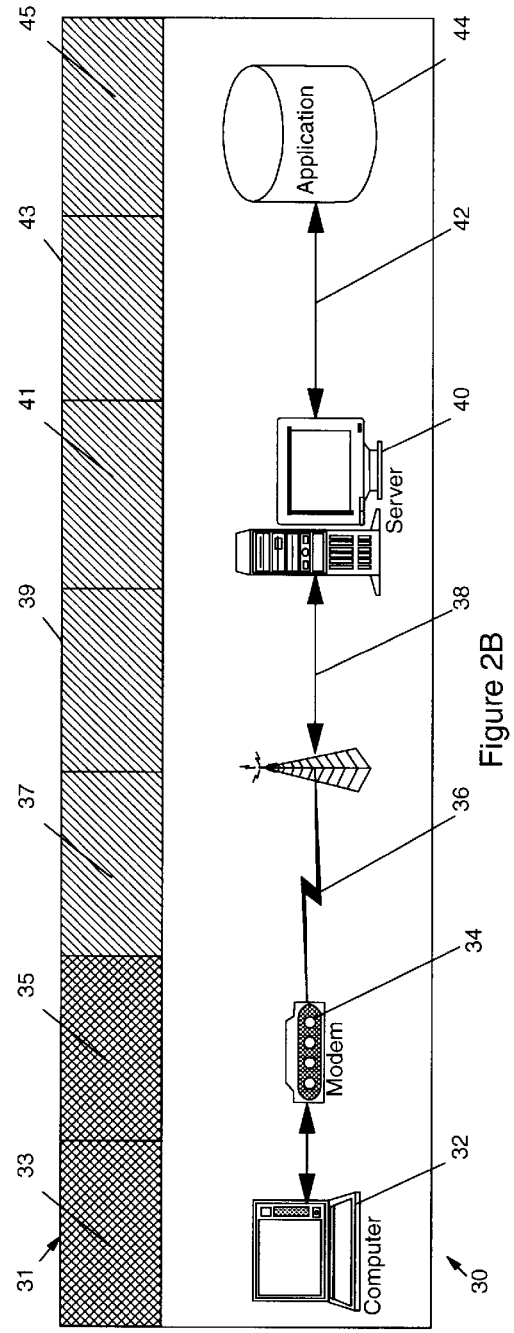
Figure 2E:
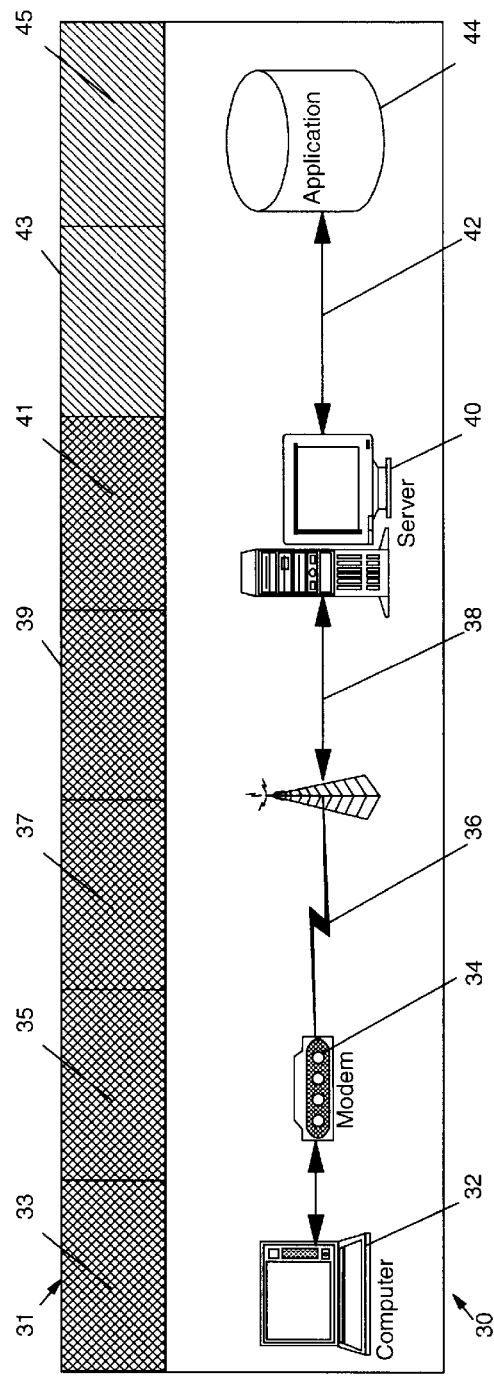
Figure 2F:
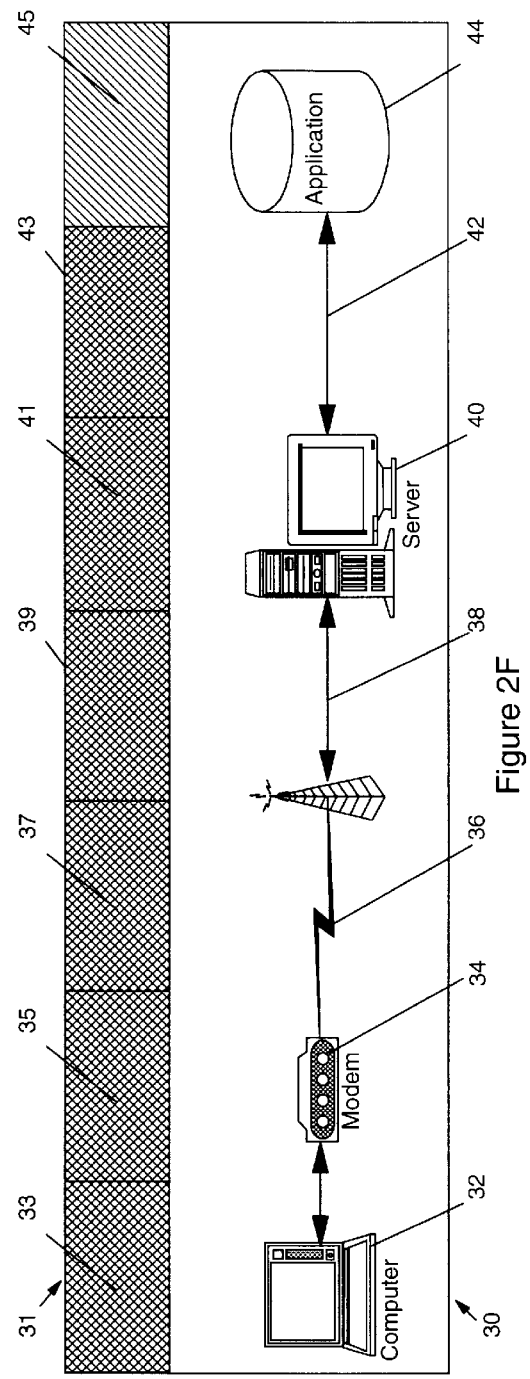

Referring now to FIGS. 2A through 2H, these figures illustrate how the various segments of the status line 31 may change based upon the status of items associated with the status window 30. This example illustrates a portable computer establishing a connection to a network server and utilizing a database available to that network server. The first step in connection is the portable computer represented by icon 32 being ready and available for use. Accordingly, FIG. 2A illustrates segment 33 having an appearance, which for purposes of illustration is represented by the cross-hatch of the segment but will generally be reported by a color, indicating that the computer is available. Turning to FIG. 2B, as the connection is initiated the computer initializes a modem which is represented by icon 34. As the portion of the connection associated with the modem is established, segment 35 changes to an appearance indicating the status of the modem is ready or available. As seen in FIG. 2C, as the connection is established from the modem to a public service provider, the segment 37 associated with that connection also changes in appearance to indicate the status of the connection as established. FIG. 2D further illustrates the connection from the public service provider to the network server being established and segment 39, therefore, changes in appearance to indicate the status of the connection. FIG. 2E illustrates the availability of the network server illustrated by icon 40. As seen in FIG. 2E, segment 41 has changed in appearance to indicate that the network server 40 is available. FIG. 2F further illustrates the connection between the network server and a database application. As seen in FIG. 2F, segment 43 is changed in appearance to indicate the existence of the connection between the network server and the database application illustrated by icon 44. Finally, FIG. 2G illustrates the completion of the connection between the portable computer represented by icon 32 and the database application represented by icon 44 with the change in appearance of segment 45 indicating that the database application 44 is available and has been initiated.

FIG. 2H illustrates one possible scenario in the event of a fault or error in the path from the portable computer represented by icon 32 to the database application represented by icon 44. As seen in FIG. 2H, the segment 41 has changed in appearance to indicate an error or fault with the network server represented by icon 40. Similarly, because the information regarding any downstream status of the connection between the network server and the database application and the status of the database application are unknown, segments 43 and 45 have also changed in appearance to show the unknown nature of the status of the items associated with icons 42 and 44. Thus, FIG. 2H illustrates three possible appearances for segments of the status line 31. Segments 33, 35, 37, and 39 indicate one particular status by their appearance, segment 41 indicates a second status level by its appearance, and segments 43 and 45 indicate a third status level by their appearance. In the event that the error with the network server is resolved, then the status segment 41 associated with the network server would return to the appearance associated with a satisfactory connection and operation of the network server 40 and the remaining status segments would reflect the status of the items associated with those status segments.

In the example reflected in FIGS. 2A through 2H, the status of the items represented by the icons and status segments of the status window 30 has been dynamically updated as the status of the associated items has changed.

Thus, a user may be constantly apprised of the status of items of interest to the user. Furthermore, the items represented in any status window 30 may vary from application to application and may even be user selectable such that a customized status segment line could be generated by a user for a particular application for items of interest. The status of applications, connections, hardware, software, networks or combinations thereof may be provided by the present invention. Icons and/or status segments may represent any number of items or a single item. Furthermore, the size and relationship of icons and/or status segments may also be user specified.

Figure 3A:
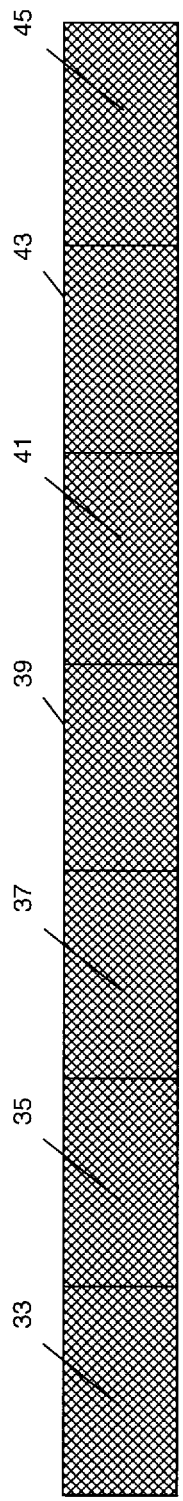
FIG. 3A and FIG. 3B are diagrams of a status window according to the present invention without displaying the icons of the status window.
Figure 3B:
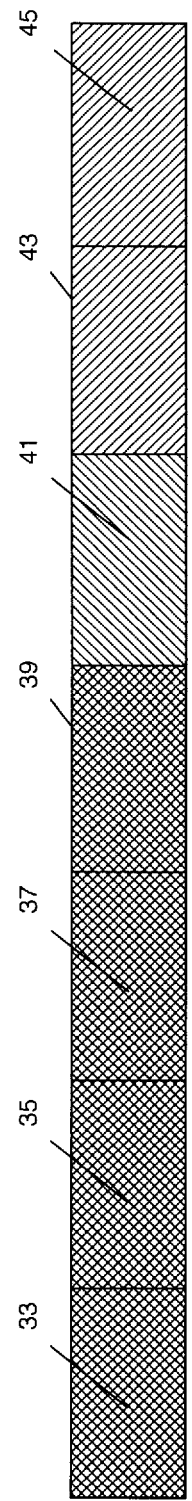

As is seen in FIGS. 2A through 2H, the status of any of the items shown in the status window 30 may be quickly ascertained with a glance to the status segment line. Furthermore, as a user becomes more familiar with the association of the segments with the items represented by the icons in the status window 30, the icons may be removed from the display, thus saving that space on a desktop. The display of a status segment line 31 without icons is illustrated in FIGS. 3A and 3B. The status segment line illustrated in FIG. 3A corresponds to the status segment line illustrated in FIG. 2G. As illustrated in FIG. 3A, all of the segments of the status line indicate an acceptable status for each of the items associated with the segments of the status line. A user familiar with the significance of the segments of the status line may quickly ascertain the status of the items associated with the status line 31. Should the user desire to display the icons associated with the status line 31, they may simply select the status line and expand the status window to include a display of the icons. One alternative method of "hiding" the icons associated with a segmented status line is to relocate the status window to the edge of the display such that the icons are no longer displayed. Alternatively, the icons could be covered up by other status windows in a stack of status windows. Either of these alternatives are facilitated by the linear physical layout of the status window of the present invention.

The status segment line 31 of FIG. 3B corresponds to the status segment line of FIG. 2H. As seen in FIG. 3B, the status of items associated with the segments of the status line have differing status levels as seen by, for example, the difference in appearance between segment 39, segment 41, and segment 43. Should the user desire further information on the nature of the status for a particular segment, the user may expand the status window as described above or select the status segment as described below.

Because the status information may be displayed in a simple linear arrangement such as illustrated in FIGS. 3A and 3B, the status information may be displayed utilizing a minimum of desktop space. Accordingly, the status segment line 31 may be sized to a user selectable size. Sizes in the range of from about 2 to about 20 pixels may be suitable for many applications. However, as will be appreciated by those of skill in the art, other heights of the status segments line may be utilized. Furthermore, the width of each individual segment of the status segment line may be modified by user input to further enlarge or reduce the amount of space utilized by the segmented status line 31.

As FIGS. 3A and 3B illustrate, the status of any segment may be readily ascertained by a quick glance at the status line 31. Thus, a user may be updated continually as to the status of the items associated with a particular status segment. Furthermore, because the status segment line utilizes a reduced amount of display space, a large amount of status information may be quickly referred to by, for example, stacking numerous segmented status lines in one region of the display. Any number of segmented status lines may be simultaneously displayed on a display device. In such a way, a user who is familiar with the significance of the status of a particular segment of the status line may monitor the status of numerous operations, systems, or functions while maximizing the amount of work space available on a display for the user of other applications. Thus, for example, a network administrator may monitor a large number of aspects of a network or group of networks while retaining the ability to perform other tasks requiring a workspace on the display.

Figure 4A:
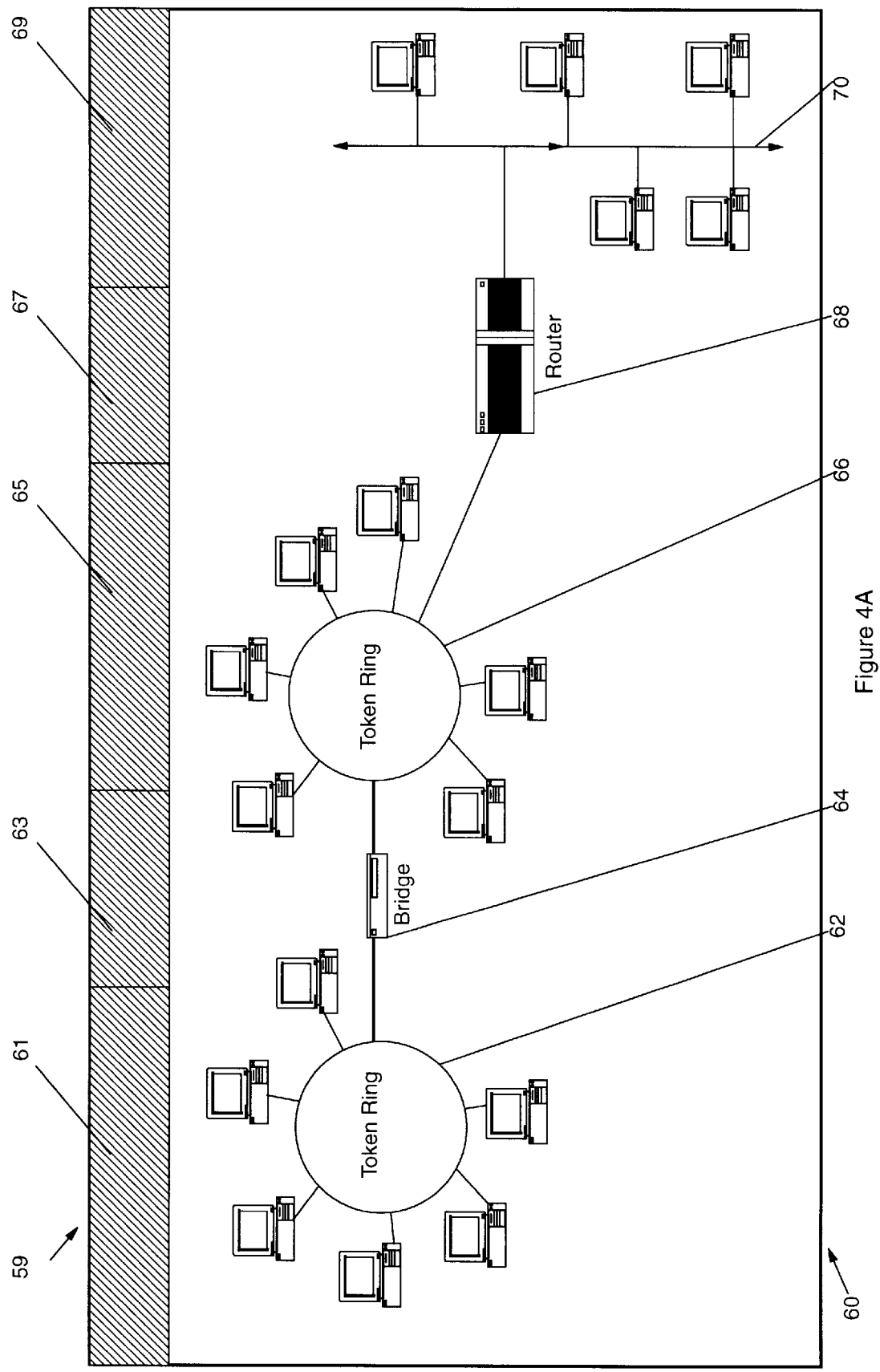

A further aspect of the present invention is illustrated in FIG. 4A. As seen in FIG. 4A, a status window 60 includes a plurality of icons 62, 64, 66, 68, and 70. Also included are segments of a segmented status line 59. As with the segments of status line 31 of FIGS. 2A through 2H, the segments of status line 59 correspond to the icons in the status window 60. For example, icon 62 which represents the status of a token ring with a plurality of workstations attached to the ring is associated with segment 61. A second token ring represented by icon 66 is associated with segment 65. A bridge between the token ring represented by icon 62 and the token ring represented by icon 66 is represented by icon 64 and has a corresponding segment 63 of the segmented status line 59. A third network having workstations attached to it is represented by icon 70 and has a corresponding segment 69 of the segmented status line 59. A router connecting the token ring network represented by icon 66 and the bus network represented by icon 70 is represented by icon 68. Segment 67 of the segmented status line 59 is associated with the router of icon 68. The status of each of the items represented by the icons of the status window 60 is reflected in the appearance of the segments of the status line 59 as described above with respect to FIGS. 2A through 2H.

Figure 4B:
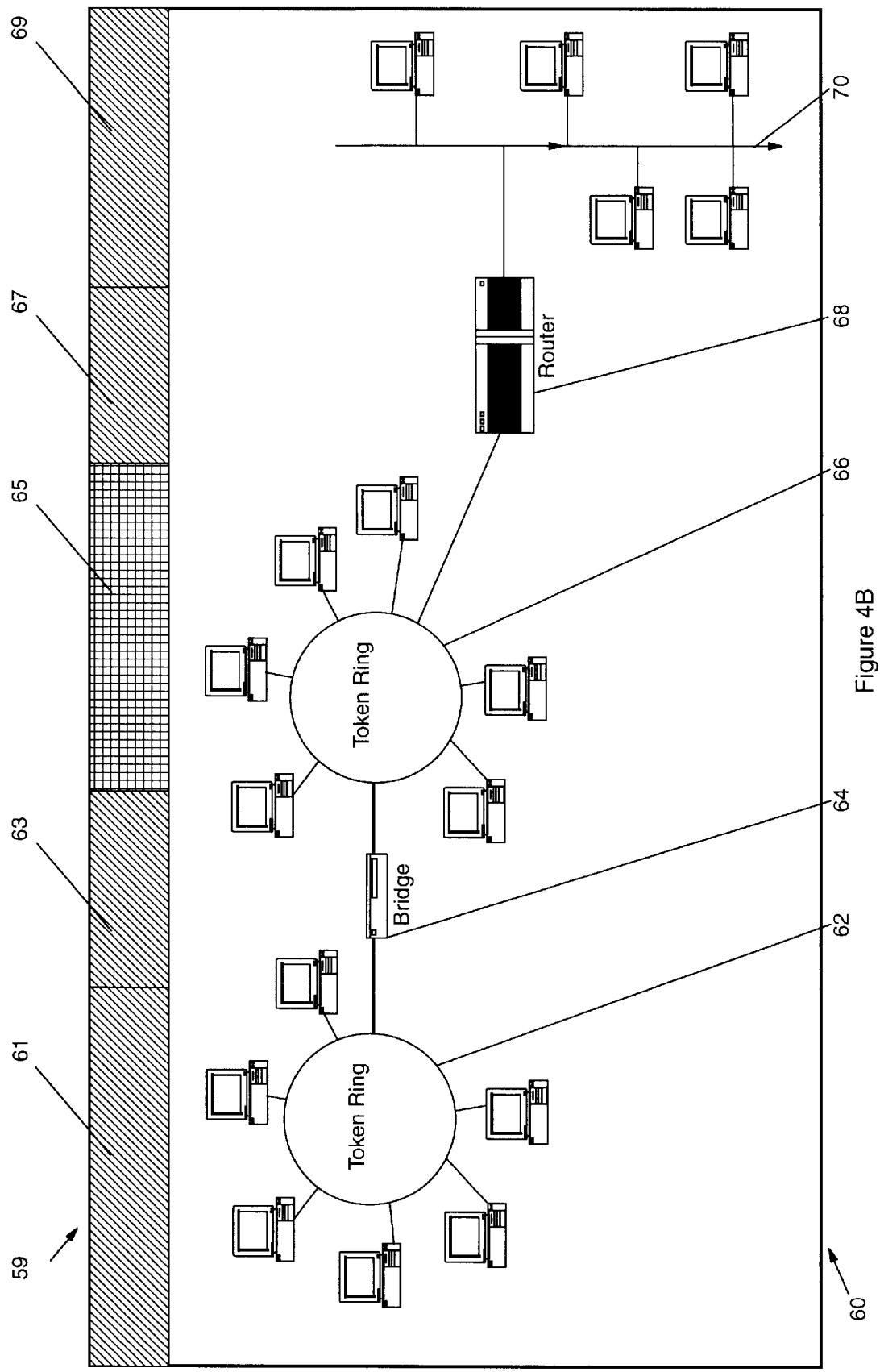

The icons represented in FIG. 4A may represent multiple items such as, for example, the workstations attached to a token ring may be represented by icon 62. Likewise, the workstations and status of a token ring network is represented by icon 66. In such a case, the segment of the status line may represent an aggregate status of all of the underlying items associated with the segment. For example, in FIG. 4A, a segment 65 of segmented status line 59 may represent the aggregate status of all of the workstations of the token ring network represented by icon 66. In such a case, if any element of the token ring network 66 changes in status, that change in status may be reflected in the appearance of segment 65. Thus, as seen in FIG. 4B, if the status of any one of the items associated with the token ring icon 66 changes then the appearance of segment 65 also changes.

As illustrated in FIG. 4C, the status of the underlying items may be displayed in addition to the aggregate status of segment 65. Thus, in the present example, if an error occurs within the token ring represented by icon 66, the segment 65 may be expanded to illustrate the status of the underlying items with their own status segments. This may be seen in FIG. 4C as status segments 71, 73, 75, 77, 79, and 81. These expanded segments may represent the status of, for example, the six workstations of icon 66. The appearance of these expanded segments would reflect the status of each individual workstation. As seen in FIG. 4C, the status of the workstation associated with segment 73 has changed and thus the appearance of segment 73 has been altered to reflect that change in status. In such a way the user may be provided with aggregate status and status of individual items which comprise the aggregate status. For example, selection of the status segment 65 with a pointing device expand that status segment to include status segments 71, 73, 75, 77, 79, and 81 which represent the underlying items of the aggregate status reflected by segment 65.

As discussed above, any of the status segments may include text to indicate the nature of the item with which the status segment is associated. As is also illustrated in FIGS. 4A through 4C, the width of any segment of the segmented status bar may vary depending upon the nature of the icon associated with the segment or based upon user input specifying a width for a particular segment or for a group of segments.

FIG. 4D illustrates an alternative method of displaying the underlying status for a status segment which displays an aggregate status. As seen in FIG. 4D, the status segment 69 indicates that the aggregate status of the network reflected by icon 70 has changed. The user, by selecting segment 69, may expand the status information to include segments 83, 85, 87, 89, and 91. These segments correspond to the status of each of the workstations reflected in icon 70. As is seen in FIG. 4D, segment 85 associated with a workstation represented by icon 70 has a differing appearance than the other segments, and thus a different status. Thus, a user is apprised of the differing status of the workstation associated with segment 85 by its differing appearance. In addition, the vertically aligned linear status line may be aligned in a fashion such that the segments correspond to the workstations of item 70 to provide additional information as to the particular workstation with the change in status. The association of an icon item with a segment could be further reinforced by highlighting an element in an aggregate icon and the status segment associated with that element. Thus, for example, a workstation of item 70 could be highlighted and the associated segment also highlighted to show the associated relationship. Thus it is preferred in the aggregate situation that some form of linkage between the icon and the status segment be discernable to the user if the spatial relationship no longer provides that linkage.

The status windows of the present invention may also include the ability to display more detailed information as to the status of an item associated with either an icon or a status segment by selection of the icon or the status segment by the user. A user could select an icon with a pointing device which would cause detailed status information about the item associated with the icon to be displayed. Additionally, a user could select a segment of the status line which would then display more detailed information about the items associated with the segmented status line. This selection may be by "pointing and clicking" or simply by positioning the pointing device over the desired item such as utilized with context sensitive help systems. Furthermore, this status may be provided in the form of more segment displays, additional windows, information in a window frame, in a pop-up dialog or any other manner known to those of skill in the art for supplying additional information about a selected item.

In addition to changing the appearance of the segments of the status line, the icons of the status window may also change as the status of the items that the icons represent changes. Thus, for example, the color of a workstation in icon 66 would change to indicate the status of a particular workstation. Furthermore, the user could select the particular workstation within the icon to receive more detailed information on the workstation status.

Figure 5:
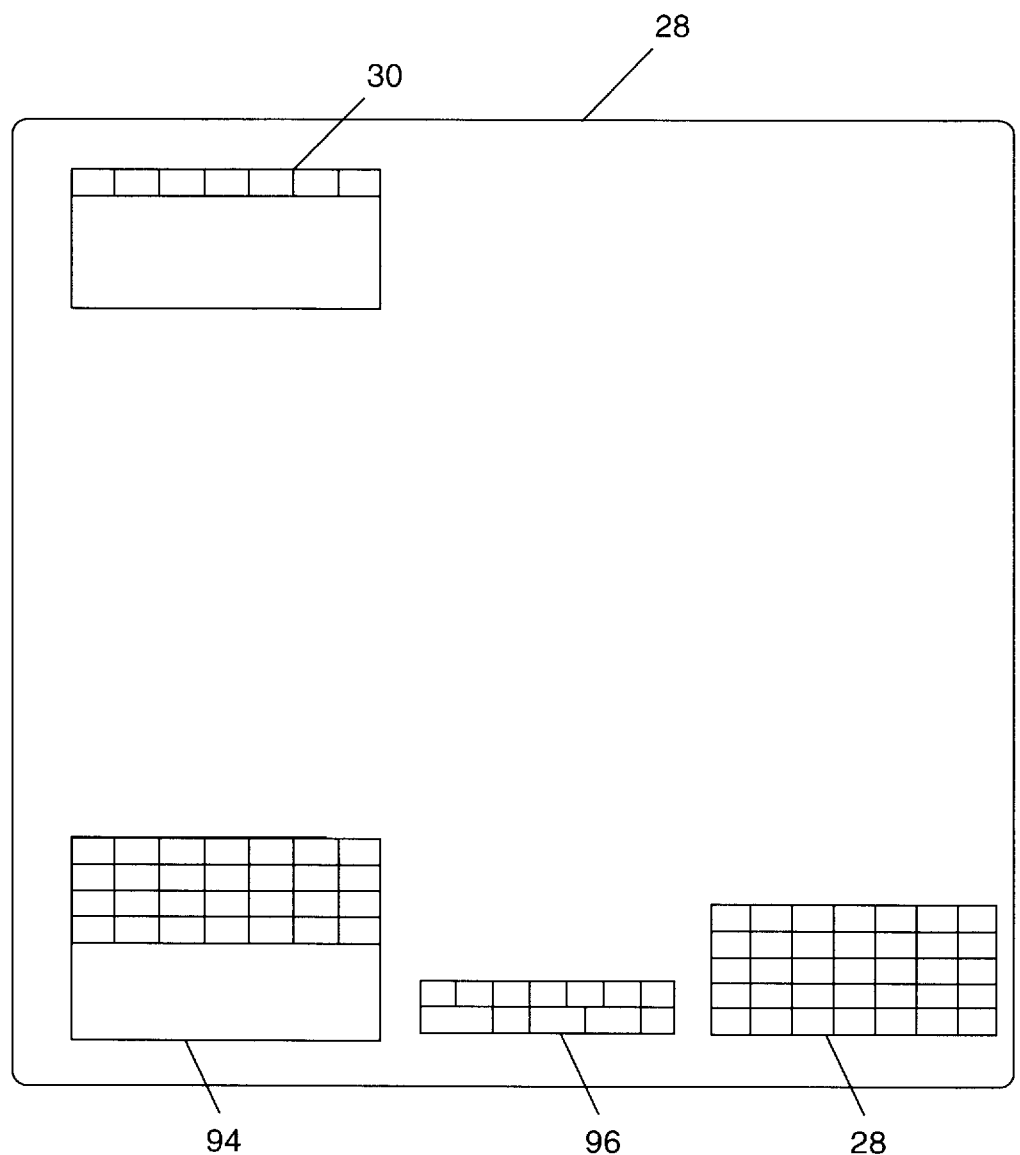
FIG. 5 is a diagram of a screen containing status windows according to the present invention.

FIG. 5 is a diagram illustrating the possible relationships of status windows according to the present invention. As seen in FIG. 5 a screen 28 may be displayed on display device 23 of FIG. 1 and may have a number of status windows displayed. For example, the status window 30 may be displayed in one portion of the screen 28 with both the segmented status line and the icons displayed.

As is further seen in FIG. 5, a plurality of segmented status lines may be arranged in an array such as is illustrated by status display 94. The status display 94 includes a plurality of segmented status lines and a display of the icons associated with the lower most status line. In such an arrangement, the segments of the status line line up so that a user may associate the segments from the other status lines of the array with the icons of the first status line. For example, if a network administrator needed to monitor a number of common aspects of different networks, the status displays could be arranged as shown by status display 94. In such a case while the segments of the status lines would display the status of different items, the operator or administrator could determine the nature of the status from the displayed icons.

Another possible arrangement of status displays is illustrated by the array of status lines 96. In such a case the segments of the status lines are of differing sizes and, therefore, do not line up. However, the status window of the present invention may still be utilized to show status in a compact and efficient manner. By displaying only status lines and by locating the status lines adjacent each other, the status window array 96 may keep a user, such as a network administrator apprised of the status of multiple items and yet only occupy a small portion of the screen. If one of the status displayed by one of the status lines of the array 96 indicates a status which necessitates further investigation, the operator could expand the status window to include its associated icons or display the more detailed information associated with a particular segment of the status line.

Status line array 98 illustrates yet another possible arrangement of status lines. Status line array 98 illustrates a case where the segments of the status lines line up but the no icons are displayed. By grouping status windows in the manner shown in array 98, the same information as with array 94 may be presented in a reduced amount of screen area. Thus, an operator could further reduce the amount of screen area required to display status of a large number of items. Furthermore, the relationship of the segments of different status lines may be utilized to facilitate the assimilation of the status information by arranging the status lines in an array of status lines.

Figure 6:
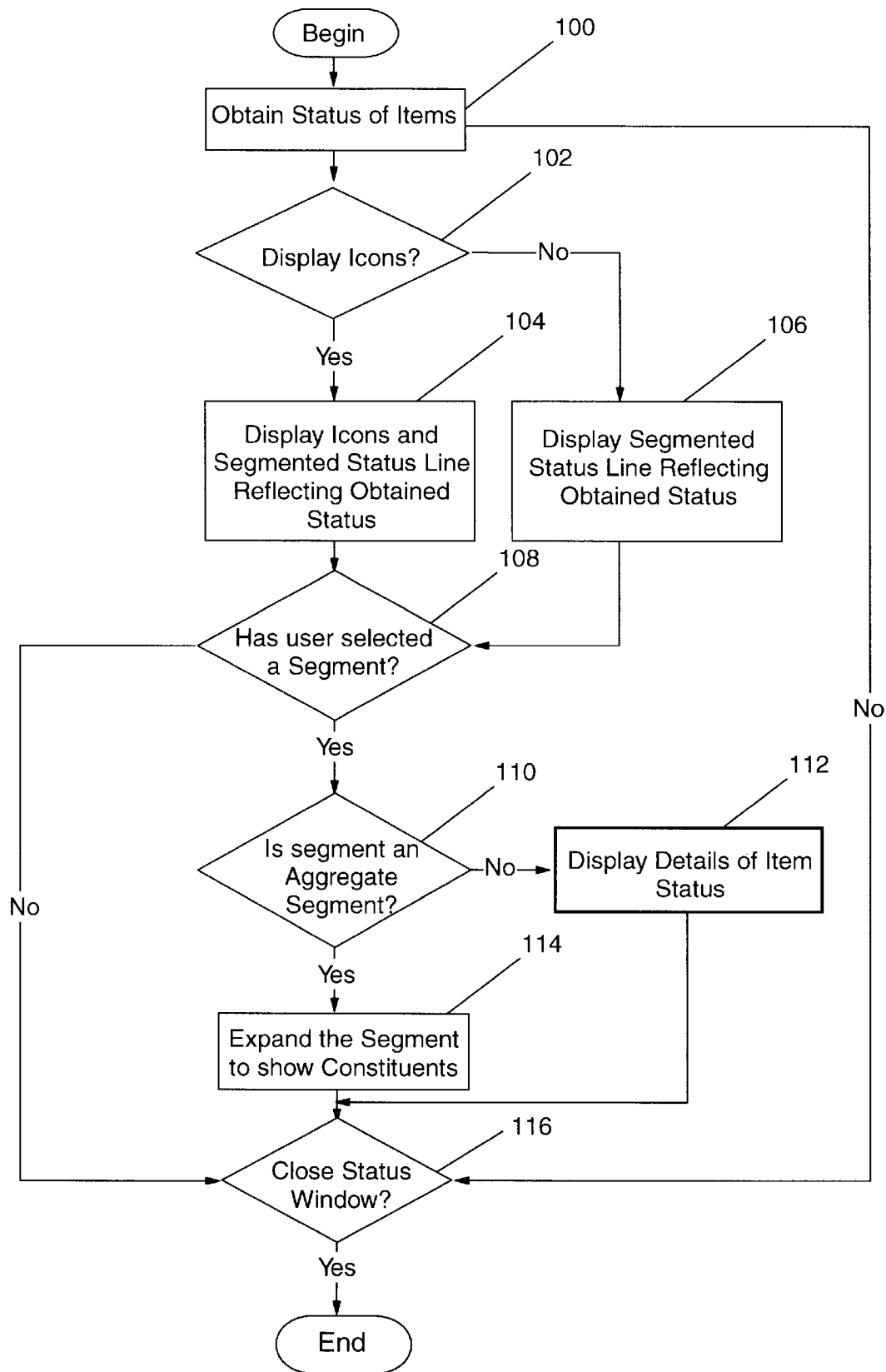
FIG. 6 is a flow chart of the process of the present invention.

FIG. 6 is a flowchart illustration of methods, apparatus (systems) and computer program products according to the invention. It will be understood that each block of the flowchart illustration, and combinations of blocks in the flowchart illustration, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

As seen in FIG. 6, block 100, the display of status begins by the acquisition of the status of the items for which status is displayed. Then, as reflected in block 102 and 104 if the user has selected the display of icons the icons and the segmented status line are displayed reflecting the acquired status. If the user has not selected the display of icons, then, as seen in block 106, only the segmented status line is displayed. If the user has selected a segment of the segmented status line, then, as blocks 108 and 110 reflect, it is determined if the selected segment reflects an aggregate segment. If the reflected segment reflects an aggregate segment then the segment is expanded to show segments corresponding to the constituent items for the aggregate segment (block 114). If the segment is not an aggregate segment then, as shown in block 112, the details of the item status are displayed. Finally, as seen in block 116 if the user has not terminated the status display then status is reobtained and redisplayed until the status window is closed by the user.

As is apparent from the above description of the present invention, the term icon is used herein to refer to a graphic representation of an item. The term icon should not be construed as limited to any particular format, size, shape or appearance of a graphic representation.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of providing dynamic status to a user, the method comprising:

displaying a plurality of icons arranged in a pattern corresponding to the relationship between the items the icons represent;

displaying a segmented status line adjacent the plurality of icons comprising a plurality of linearly arranged status segments wherein each segment of the status line corresponds to at least one of said plurality of icons such that the appearance of a segment of the segmented status line reflects the status of the item associated with the icon corresponding to the segment of the status line and wherein the status segment corresponding to an icon is aligned with its corresponding icon such that the sequence of the segments of the status line corresponds to the relationship between the items represented by said icons;

revising the appearance of a segment of the segmented status line as the status of the item corresponding to the segment of the status line changes;

acquiring user input indicating whether the plurality of icons are to be displayed;

removing the plurality of icons from the display when said acquiring step acquires user input indicating that the plurality of icons are not to be displayed.

2. A method according to claim 1, wherein said revising step alters the color of the segments of the segmented status line to reflect the status of the items associated with the segment of the segmented status line.

3. A method according to claim 1, wherein said revising step alters the shape of the segments of the segmented status line to reflect the status of the items associated with the segment of the segmented status line.

4. A method according to claim 1, wherein said step of displaying a segmented status line further comprises displaying at least one segment of the segmented status line which includes text indicating the item associated with the segment of the segmented status line.

5. A method according to claim 1, wherein said step of displaying a segmented status line further comprises displaying at least one segment of the segmented status line which includes text indicating the status of the item associated with the segment of the segmented status line.

6. A method according to claim 1 wherein the segmented status line has a height and a width, the method further comprising the steps of:

receiving user input to specify the height of the segmented status line; and wherein said step of displaying a segmented status line further comprises displaying a segmented status line of a height specified by a user in said receiving step.

7. A method according to claim 6, wherein said receiving step comprises receiving a height for the segmented status line of from about 2 to about 20 pixels.

8. A method according to claim 1, the method further comprising the steps of:

acquiring user input indicating selection of one of the segments of the segmented status line; and displaying detailed status information related to the item corresponding to the selected one of the segments of the segmented status line.

9. A method according to claim 1, further comprising the step of changing the appearance of at least one of the plurality of icons to reflect the status of the item associated with the icon.

10. A method according to claim 1, wherein the plurality of icons comprises a first plurality of icons and wherein the segmented status line comprises a first segmented status line, the method further comprising the steps of:

displaying a second segmented status line adjacent the first segmented status line, wherein said second segmented status line corresponds to a second plurality of icons and comprising a plurality of linearly arranged status segments wherein each segment of the second segmented status line corresponds to at least one of the second plurality of icons such that the appearance of a segment of the segmented status line reflects the status of the item associated with the icon corresponding to the segment of the second segmented status line; and revising the appearance of a segment of the second segmented status line as the status of the item corresponding to the segment of the second segmented status line changes.

11. A method according to claim 10, wherein the second plurality of icons comprises the first plurality of icons.

12. A method of providing dynamic status to a user, the method comprising:

displaying a plurality of icons arranged in a pattern corresponding to the relationship between the items the icons represent and wherein at least one of the plurality of icons represents a plurality of items;

displaying a segmented status line adjacent the plurality of icons comprising a plurality of linearly arranged status segments wherein each segment of the status line corresponds to at least one of said plurality of icons such that the appearance of a segment of the segmented status line reflects the status of the item associated with the icon corresponding to the segment of the status line and wherein the status segment corresponding to an icon is aligned with its corresponding icon such that the sequence of the segments of the status line corresponds to the relationship between the items represented by said icons and wherein the status segment corresponding to the at least one icon reflects the aggregate status of the items represented by the at least one icon; and revising the appearance of a segment of the segmented status line as the status of the item corresponding to the segment of the status line changes.

13. A method according to claim 12, further comprising the following steps:

acquiring user input indicating selection of one of the segments of the segmented status line; and displaying the status information of the underlying items of the aggregate status corresponding to the selected one of the segments of the segmented status line.

14. A method according to claim 13 wherein said step of displaying the status of the underlying items further comprises displaying a linear segment for each underlying item of the aggregate status wherein the appearance of the linear segments corresponds to the status of one of the underlying items of the aggregate status.

15. A method according to claim 12, wherein said revising step alters the color of the segments of the segmented status line to reflect the status of the items associated with the segment of the segmented status line.

16. A method according to claim 12, wherein said revising step alters the shape of the segments of the segmented status line to reflect the status of the items associated with the segment of the segmented status line.

17. A method according to claim 12, wherein said step of displaying a segmented status line further comprises displaying at least one segment of the segmented status line which includes text indicating the item associated with the segment of the segmented status line.

18. A method according to claim 12, wherein said step of displaying a segmented status line further comprises displaying at least one segment of the segmented status line which includes text indicating the status of the item associated with the segment of the segmented status line.

19. A method according to claim 12, further comprising the step of changing the appearance of at least one of the plurality of icons to reflect the status of the item associated with the icon.

20. A method according to claim 12, wherein the plurality of icons comprises a first plurality of icons and wherein the segmented status line comprises a first segmented status line, the method further comprising the steps of:

displaying a second segmented status line adjacent the first segmented status line, wherein said second segmented status line corresponds to a second plurality of icons and comprising a plurality of linearly arranged status segments wherein each segment of the second segmented status line corresponds to at least one of the second plurality of icons such that the appearance of a segment of the segmented status line reflects the status of the item associated with the icon corresponding to the segment of the second segmented status line; and revising the appearance of a segment of the second segmented status line as the status of the item corresponding to the segment of the second segmented status line changes.

21. A method according to claim 20, wherein the second plurality of icons comprises the first plurality of icons.

22. A system for providing dynamic status to a user, comprising:

a display device;

means for displaying a plurality of icons arranged in a pattern corresponding to the relationship between the items the icons represent on said display device;

means for displaying on said display device a segmented status line adjacent the plurality of icons comprising a plurality of linearly arranged status segments wherein each segment of the status line corresponds to at least one of said plurality of icons such that the appearance of a segment of the segmented status line reflects the status of the item associated with the icon corresponding to the segment of the status line and wherein the status segment corresponding to an icon is aligned with its corresponding icon such that the sequence of the segments of the status line corresponds to the relationship between the items represented by said icons;

means, associated with said means for displaying a segmented status line, for revising the appearance of a segment of the segmented status line as the status of the item corresponding to the segment of the status line changes;

means for acquiring user input indicating whether the plurality of icons are to be displayed;

means for removing the plurality of icons from the display on said display device when said acquiring step acquires user input indicating that the plurality of icons are not to be displayed.

23. A system according to claim 22, wherein said means for revising further comprises means for altering the color of the segments of the segmented status line to reflect the status of the items associated with the segment of the segmented status line.

24. A system according to claim 22, wherein said means for revising further comprises means for altering the shape of the segments of the segmented status line to reflect the status of the items associated with the segment of the segmented status line.

25. A system according to claim 22, wherein said means for displaying a segmented status line further comprises means for displaying at least one segment of the segmented status line which includes text indicating the item associated with the segment of the segmented status line.

26. A system according to claim 22, wherein said means for displaying a segmented status line further comprises means for displaying at least one segment of the segmented status line which includes text indicating the status of the item associated with the segment of the segmented status line.

27. A system according to claim 22 wherein the segmented status line has a height and a width, the system further comprising:

means for receiving user input to specify the height of the segmented status line; and wherein said means for displaying a segmented status line further comprises means for displaying a segmented status line of a height specified by a user in said receiving step.

28. A system according to claim 22, the system further comprising:

means for acquiring user input indicating selection of one of the segments of the segmented status line; and means, responsive to said means for acquiring user input indicating selection of one of the segments, for displaying detailed status information related to the item corresponding to the selected one of the segments of the segmented status line.

29. A system according to claim 22, further comprising means for changing the appearance of at least one of the plurality of icons to reflect the status of the item associated with the icon.

30. A system according to claim 22, wherein the plurality of icons comprises a first plurality of icons and wherein the segmented status line comprises a first segmented status line, the system further comprising:

means for displaying a second segmented status line adjacent the first segment status line, wherein said second segmented status line corresponds to a second plurality of icons and comprising a plurality of linearly arranged status segments wherein each segment of the second segmented status line corresponds to at least one of the second plurality of icons such that the appearance of a segment of the segmented status line reflects the status of the item associated with the icon corresponding to the segment of the second segmented status line; and means, associated with said means for displaying a second segmented status line, for revising the appearance of a segment of the second segmented status line as the status of the item corresponding to the segment of the second segmented status line changes.

31. A system according to claim 30, wherein the second plurality of icons comprises the first plurality of icons.

32. A system for providing dynamic status to a user, comprising:

a display device;

means for displaying on said display device a plurality of icons arranged in a pattern corresponding to the relationship between the items the icons represent and wherein at least one of the plurality of icons represents a plurality of items;

means for displaying a segmented status line adjacent the plurality of icons comprising a plurality of linearly arranged status segments wherein each segment of the status line corresponds to at least one of said plurality of icons such that the appearance of a segment of the segmented status line reflects the status of the item associated with the icon corresponding to the segment of the status line and wherein the status segment corresponding to an icon is aligned with its corresponding icon such that the sequence of the segments of the status line correspond to the relationship between the items represented by said icons and wherein the status segment corresponding to the at least one icon reflects the aggregate status of the items represented by the at least one icon; and means, responsive to said means for displaying a segmented status line, for revising the appearance of a segment of the segmented status line as the status of the item corresponding to the segment of the status line changes.

33. A system according to claim 32, further comprising:

means for acquiring user input indicating selection of one of the segments of the segmented status line; and means, responsive to said means for acquiring user input indicating selection of one of the segments, for displaying the status information of the underlying items of the aggregate status corresponding to the selected one of the segments of the segmented status line.

34. A system according to claim 33 wherein said means for displaying the status information of the underlying items further comprises means for displaying a linear segment for each underlying item of the aggregate status wherein the appearance of the linear segments corresponds to the status of one of the underlying items of the aggregate status.

35. A system according to claim 32, wherein said means for revising further comprises means for altering the color of the segments of the segmented status line to reflect the status of the items associated with the segment of the segmented status line.

36. A system according to claim 32, wherein said means for revising further comprises means for altering the shape of the segments of the segmented status line to reflect the status of the items associated with the segment of the segmented status line.

37. A system according to claim 32, wherein said means for displaying a segmented status line further comprises means for displaying at least one segment of the segmented status line which includes text indicating the item associated with the segment of the segmented status line.

38. A system according to claim 32, wherein said means for displaying a segmented status line further comprises means for displaying at least one segment of the segmented status line which includes text indicating the status of the item associated with the segment of the segmented status line.

39. A system according to claim 32, further comprising means for changing the appearance of at least one of the plurality of icons to reflect the status of the item associated with the icon.

40. A system according to claim 32, wherein the plurality of icons comprises a first plurality of icons and wherein the segmented status line comprises a first segmented status line, the system further comprising:

means for displaying a second segmented status line adjacent the first segment status line, wherein said second segmented status line corresponds to a second plurality of icons and comprising a plurality of linearly arranged status segments wherein each segment of the second segmented status line corresponds to at least one of the second plurality of icons such that the appearance of a segment of the segmented status line reflects the status of the item associated with the icon corresponding to the segment of the second segmented status line; and means, associated with said means for displaying, for revising the appearance of a segment of the second segmented status line as the status of the item corresponding to the segment of the second segmented status line changes.

41. A system according to claim 40, wherein the second plurality of icons comprises the first plurality of icons.

42. A computer program product for providing dynamic status to a user through a display on a display device, the computer program product comprising:

a computer readable storage medium having computer-readable program code means embodied in said medium, said computer-readable program code means comprising:

computer-readable program code means for displaying a plurality of icons arranged in a pattern corresponding to the relationship between the items the icons represent on said display device;

computer-readable program code means for displaying on said display device a segmented status line adjacent the plurality of icons comprising a plurality of linearly arranged status segments wherein each segment of the status line corresponds to at least one of said plurality of icons such that the appearance of a segment of the segmented status line reflects the status of the item associated with the icon corresponding to the segment of the status line and wherein the status segment corresponding to an icon is aligned with its corresponding icon such that the sequence of the segments of the status line correspond to the relationship between the items represented by said icons;

computer-readable program code means, associated with said computer-readable program code means for displaying a segmented status line, for revising the appearance of a segment of the segmented status line as the status of the item corresponding to the segment of the status line changes;

computer-readable program code means for acquiring user input indicating whether the plurality of icons are to be displayed;

computer-readable program code means for removing the plurality of icons from the display on said display device when said acquiring step acquires user input indicating that the plurality of icons are not to be displayed.

43. A computer program product according to claim 42, wherein said computer-readable program code means for revising further comprises computer-readable program code means for altering the color of the segments of the segmented status line to reflect the status of the items associated with the segment of the segmented status line.

44. A computer program product according to claim 42, wherein said computer-readable program code means for revising further comprises computer-readable program code means for altering the shape of the segments of the segmented status line to reflect the status of the items associated with the segment of the segmented status line.

45. A computer program product according to claim 42, wherein said computer-readable program code means for displaying a segmented status line further comprises computer-readable program code means for displaying at least one segment of the segmented status line which includes text indicating the item associated with the segment of the segmented status line.

46. A computer program product according to claim 42, wherein said computer-readable program code means for displaying a segmented status line further comprises computer-readable program code means for displaying at least one segment of the segmented status line which includes text indicating the status of the item associated with the segment of the segmented status line.

47. A computer program product according to claim 42 wherein the segmented status line has a height and a width, the computer program product further comprising:

computer-readable program code means for receiving user input to specify the height of the segmented status line; and wherein said computer-readable program code means for displaying a segmented status line further comprises computer-readable program code means for displaying a segmented status line of a height specified by a user in said receiving step.

48. A computer program product according to claim 42, the computer program product further comprising:

computer-readable program code means for acquiring user input indicating selection of one of the segments of the segmented status line; and computer-readable program code means, responsive to said computer-readable program code means for acquiring user input indicating selection of one of the segments, for displaying detailed status information related to the item corresponding to the selected one of the segments of the segmented status line.

49. A computer program product according to claim 42, further comprising computer-readable program code means for changing the appearance of at least one of the plurality of icons to reflect the status of the item associated with the icon.

50. A computer program product according to claim 42, wherein the plurality of icons comprises a first plurality of icons and wherein the segmented status line comprises a first segmented status line, the computer program product further comprising:

computer-readable program code means for displaying a second segmented status line adjacent the first segmented status line, wherein said second segmented status line corresponds to a second plurality of icons and comprising a plurality of linearly arranged status segments wherein each segment of the second segmented status line corresponds to at least one of the second plurality of icons such that the appearance of a segment of the segmented status line reflects the status of the item associated with the icon corresponding to the segment of the second segmented status line; and computer-readable program code means, associated with said computer-readable program code means for displaying a second segmented status line, for revising the appearance of a segment of the second segmented status line as the status of the item corresponding to the segment of the second segmented status line changes.

51. A computer program product for providing dynamic status to a user through a display on a display device, the computer program product comprising:

a computer readable storage medium having computer-readable program code means embodied in said medium, said computer-readable program code means comprising:

computer-readable program code means for displaying on said display device a plurality of icons arranged in a pattern corresponding to the relationship between the items the icons represent and wherein at least one of the plurality of icons represents a plurality of items;

computer-readable program code means for displaying a segmented status line adjacent the plurality of icons comprising a plurality of linearly arranged status segments wherein each segment of the status line corresponds to at least one of said plurality of icons such that the appearance of a segment of the segmented status line reflects the status of the item associated with the icon corresponding to the segment of the status line and wherein the status segment corresponding to an icon is aligned with its corresponding icon such that the sequence of the segments of the status line corresponds to the relationship between the items represented by said icons and wherein the status segment corresponding to the at least one icon reflects the aggregate status of the items represented by the at least one icon; and computer-readable program code means, responsive to said computer-readable program code means for displaying a segmented status line, for revising the appearance of a segment of the segmented status line as the status of the item corresponding to the segment of the status line changes.

52. A computer program product according to claim 51, further comprising:

computer-readable program code means for acquiring user input indicating selection of one of the segments of the segmented status line; and computer-readable program code means, responsive to said computer-readable program code means for acquiring user input indicating selection of one of the segments, for displaying the status information of the underlying items of the aggregate status corresponding to the selected one of the segments of the segmented status line.

53. A computer program product according to claim 52 wherein said computer-readable program code means for displaying the status information of the underlying items further comprises computer-readable program code means for displaying a linear segment for each underlying item of the aggregate status wherein the appearance of the linear segments corresponds to the status of one of the underlying items of the aggregate status.

54. A computer program product according to claim 51, wherein said computer-readable program code means for revising further comprises computer-readable program code means for altering the color of the segments of the segmented status line to reflect the status of the items associated with the segment of the segmented status line.

55. A computer program product according to claim 51, wherein said computer-readable program code means for revising further comprises computer-readable program code means for altering the shape of the segments of the segmented status line to reflect the status of the items associated with the segment of the segmented status line.

56. A computer program product according to claim 51, wherein said computer-readable program code means for displaying a segmented status line further comprises computer-readable program code means for displaying at least one segment of the segmented status line which includes text indicating the item associated with the segment of the segmented status line.

57. A computer program product according to claim 51, wherein said computer-readable program code means for displaying a segmented status line further comprises computer-readable program code means for displaying at least one segment of the segmented status line which includes text indicating the status of the item associated with the segment of the segmented status line.

58. A computer program product according to claim 51, further comprising computer-readable program code means for changing the appearance of at least one of the plurality of icons to reflect the status of the item associated with the icon.

59. A computer program product according to claim 51, wherein the plurality of icons comprises a first plurality of icons and wherein the segmented status line comprises a first segmented status line, the computer program product further comprising:

computer-readable program code means for displaying a second segmented status line adjacent the first segmented status line, wherein said second segmented status line corresponds to a second plurality of icons and comprising a plurality of linearly arranged status segments wherein each segment of the second segmented status line corresponds to at least one of the second plurality of icons such that the appearance of a segment of the segmented status line reflects the status of the item associated with the icon corresponding to the segment of the second segmented status line; and computer-readable program code means, associated with said computer-readable program code means for displaying, for revising the appearance of a segment of the second segmented status line as the status of the item corresponding to the segment of the second segmented status line changes.

* * * * *